United States Patent
Nien et al.

(10) Patent No.: US 8,514,204 B2
(45) Date of Patent: Aug. 20, 2013

(54) BOUNDARY RESOLUTION IMPROVEMENT FOR A CAPACITIVE TOUCH PANEL

(75) Inventors: Hung Nien, Hsinchu (TW); Yi-Hsin Tao, Hsinchu (TW); Chih-Hsien Teng, Taipei (TW); Hsin-Shieh Tsai, Changhua County (TW); Chun-Chung Huang, Hsinchu (TW); Chia-Hsing Lin, Hsinchu (TW)

(73) Assignee: Elan Microelectronics Corporation, Hsinchu (TW)

( * ) Notice: Subject to any disclaimer, the term of this patent is extended or adjusted under 35 U.S.C. 154(b) by 317 days.

(21) Appl. No.: 12/868,210

(22) Filed: Aug. 25, 2010

(65) Prior Publication Data

US 2011/0050635 A1     Mar. 3, 2011

(30) Foreign Application Priority Data

Aug. 28, 2009 (TW) .............................. 98129043 A

(51) Int. Cl.
*G06F 3/041*     (2006.01)
*G06F 3/042*     (2006.01)
*G06F 3/043*     (2006.01)
*G06F 3/045*     (2006.01)

(52) U.S. Cl.
USPC ........... 345/178; 345/173; 345/174; 345/175; 345/176; 345/177; 178/18.01; 178/18.02; 178/18.03; 178/18.04; 178/18.05; 178/18.06

(58) Field of Classification Search
USPC ........................................................ 345/178
See application file for complete search history.

(56) References Cited

U.S. PATENT DOCUMENTS

2009/0167725 A1*   7/2009   Lee et al. ...................... 345/178

\* cited by examiner

*Primary Examiner* — Sumati Lefkowitz
*Assistant Examiner* — Andrew Yeretsky
(74) *Attorney, Agent, or Firm* — Muncy, Geissler, Olds & Lowe, PLLC

(57) ABSTRACT

A capacitive touch panel has a plurality of traces including a boundary trace, and a virtual trace is defined outward of the boundary trace and assigned with a virtual coordinate and a virtual capacitance for interpolation to position a touch point around the boundary of the capacitive touch panel, thereby eliminating the non-addressable region of the capacitive touch panel.

4 Claims, 3 Drawing Sheets

BOUNDARY RESOLUTION IMPROVEMENT FOR A CAPACITIVE TOUCH PANEL

FIELD OF THE INVENTION

The present invention is related generally to a capacitive touch panel and, more particularly, to a positioning method for a capacitive touch panel.

BACKGROUND OF THE INVENTION

As shown in FIG. 1, a capacitive touch panel 10 has a plurality of traces 14, 16, 18, 20 and 22 in X-direction, which are assigned with the coordinates $X_1$, $X_2$, $X_3$, $X_4$ and $X_5$ respectively, from the boundary 12 to the right. Each coordinate $X_m$ represents where the center of the corresponding trace is in the X-direction, and the coordinate $X_m$ may be a relative coordinate or an absolute coordinate in the X-direction. When the capacitive touch panel 10 is touched, the capacitances of the touched traces are changed. By sensing the traces 14, 16, 18, 20 and 22 for the capacitances thereon, the measured capacitances $C_m$, typically converted by an analog-to-digital converter (not shown in FIG. 1) into digital values, are used together with the coordinate $X_m$ for interpolation to position the touch point at the coordinate $$X = \sum_{m=1}^{n} (X_m \times C_m) \bigg/ \sum_{m=1}^{n} C_m, \qquad \text{[Eq-1]}$$

where n is the number of the traces. However, this method is good only for positioning the touch points within the range 24. If the usable area of the capacitive touch panel 10 is extended to the boundary 12 for hardware-related reasons, due to the coordinates $X_m$ of the traces 14, 16, 18, 20 and 22 all defined in correspondence to their respective centers, any touch points around the boundary 12 and beyond (i.e., to the left of) the center $X_1$ of the boundary trace 14 cannot be positioned precisely by the above interpolation algorithm and thus a non-addressable region 26 is present. All capacitive touch panels have such non-addressable regions at their boundaries that are useless for user's touch operation.

SUMMARY OF THE INVENTION

It is an object of the present invention to provide a method for boundary resolution improvement of a capacitive touch panel.

According to the present invention, a virtual trace outward of the boundary trace of a capacitive touch panel is defined and assigned with a virtual coordinate and a virtual capacitance for interpolation to position a touch point around the boundary, thereby eliminating the non-addressable region of the capacitive touch panel.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 1:
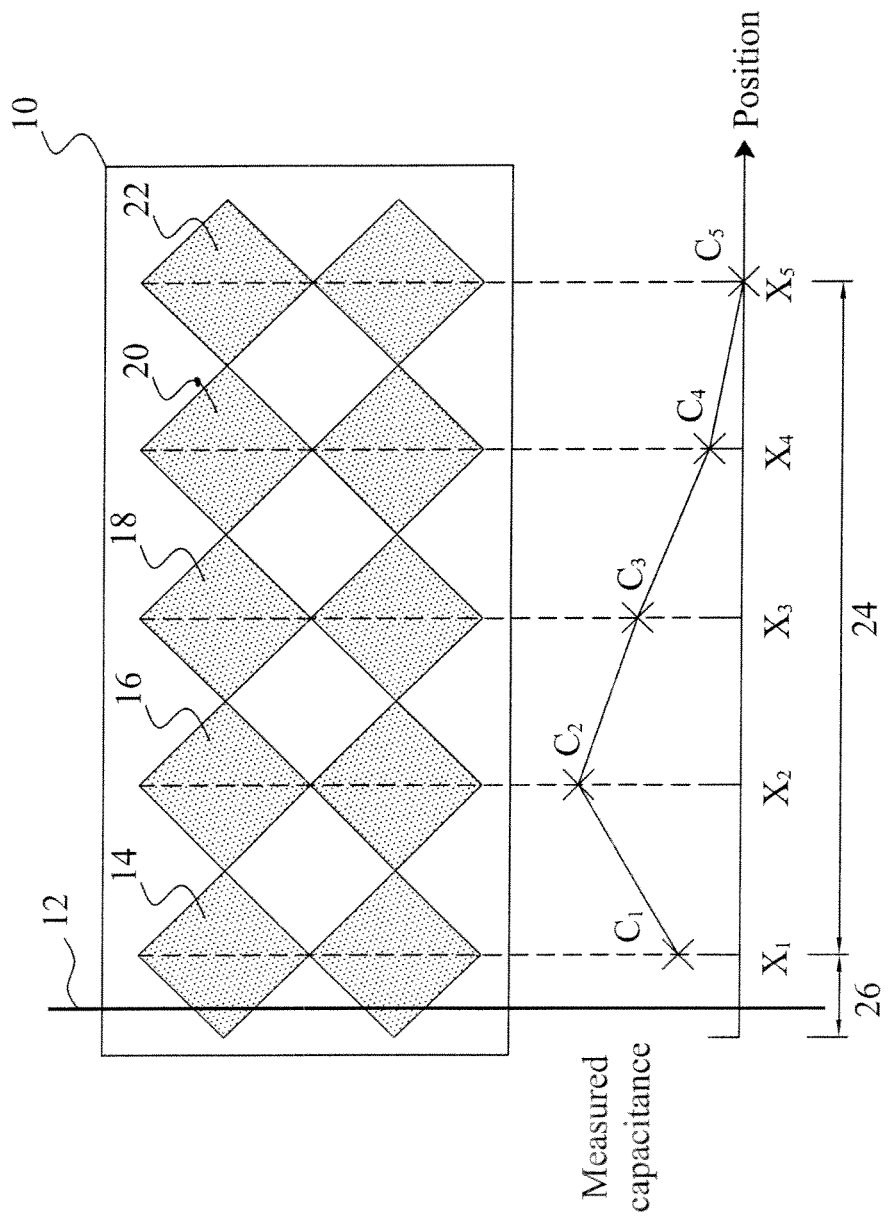
FIG. 1 is a schematic diagram showing conventional positioning methods for a capacitive touch panel using interpolation algorithm.
Figure 2:
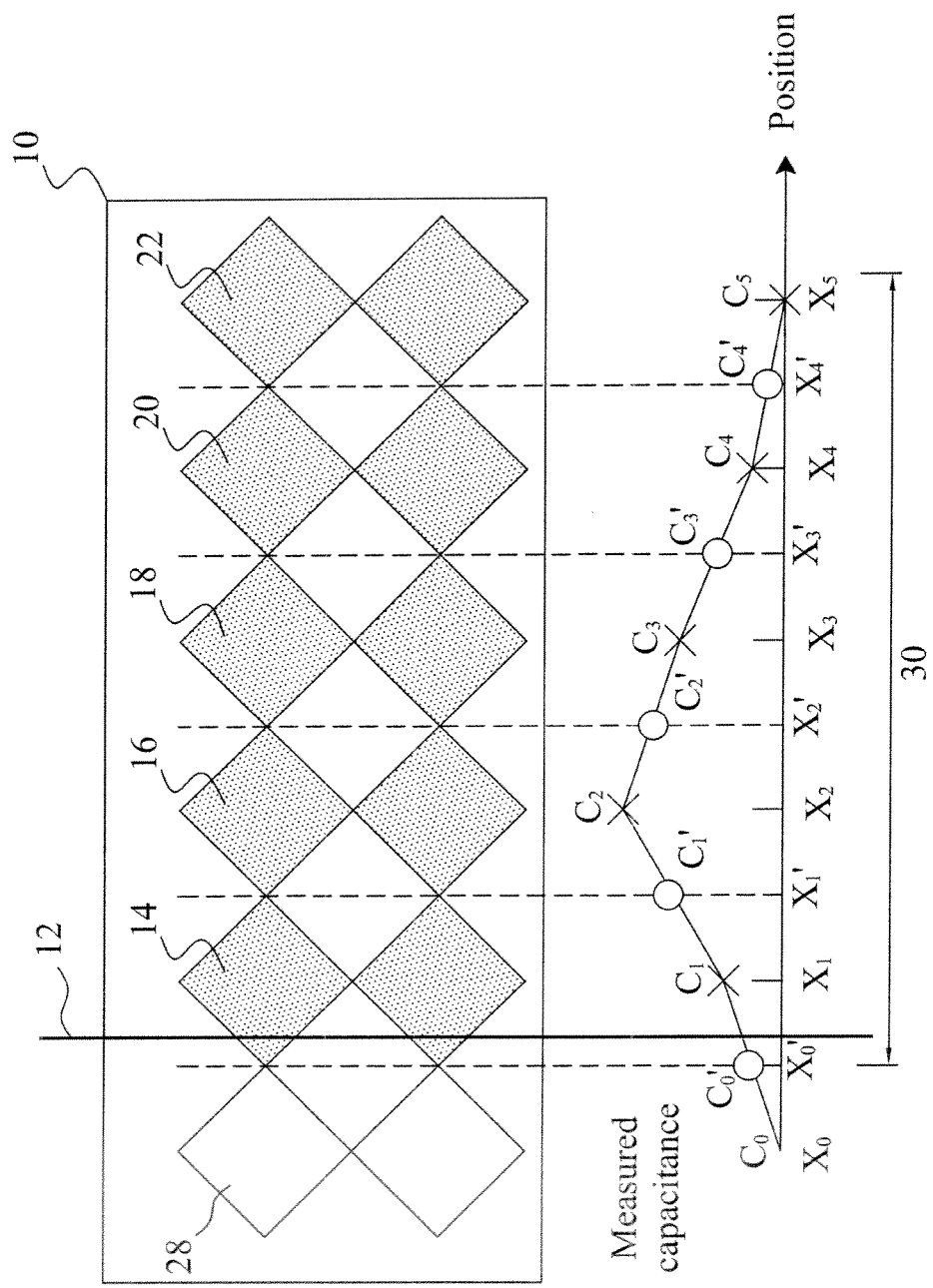
FIG. 2 is a schematic diagram showing a positioning method for a capacitive touch panel according to the present invention.

According to the present invention, as shown in FIG. 2, for a capacitive touch panel 10 having a plurality of traces 14, 16, 18, 20 and 22 in X-direction, a virtual trace 28 is defined outward of the boundary trace 14 and assigned with a virtual coordinate $X_0$ in the X-direction. The term "virtual" indicates the trace 28 not physical or hardware as are the traces 14, 16, 18, 20 and 22. When the capacitive touch panel 10 is touched, the capacitances of the touched physical traces are changed, and the measured capacitances $C_m$ from the physical traces 14, 16, 18, 20 and 22 are converted by an analog-to-digital converter (not shown in FIG. 2) into digital values. For interpolation to calculate the coordinate X of the touch point, a virtual measured capacitance $C_0$ is assigned to the virtual trace 28. For example, in this embodiment, the virtual measured capacitance $C_0$ is preset at zero. In order to determine the coordinate X of the touch point, the mean coordinates of each two adjacent ones of the physical and virtual traces 14, 16, 18, 20, 22 and 28 are calculated by the equation $X'_m = (X_m - X_{m+1})/2$, as indicated by the coordinates $X_0'$, $X_1'$, $X_2'$, $X_3'$ and $X_4'$ shown in FIG. 2, the averages of the measured capacitances of each two adjacent ones of the physical and virtual traces 14, 16, 18, 20, 22 and 28 are calculated by the equation $C'_m = (C_m + C_{m+1})/2$, as indicated by the measured capacitances $C_0'$, $C_1'$, $C_2'$, $C_3'$ and $C_4'$ shown in FIG. 2, and then the mean coordinates and the averages measured capacitances are used for interpolation to calculate the coordinate $$X = \sum_{m=0}^{n-1} (X'_m \times C'_m) \bigg/ \sum_{m=0}^{n-1} C'_m, \qquad \text{[Eq-2]}$$

where n is the number of the physical traces. With this method, any touch points within the region 30 can be positioned, thereby eliminating the addressable region 26 shown in FIG. 1.

Figure 3:
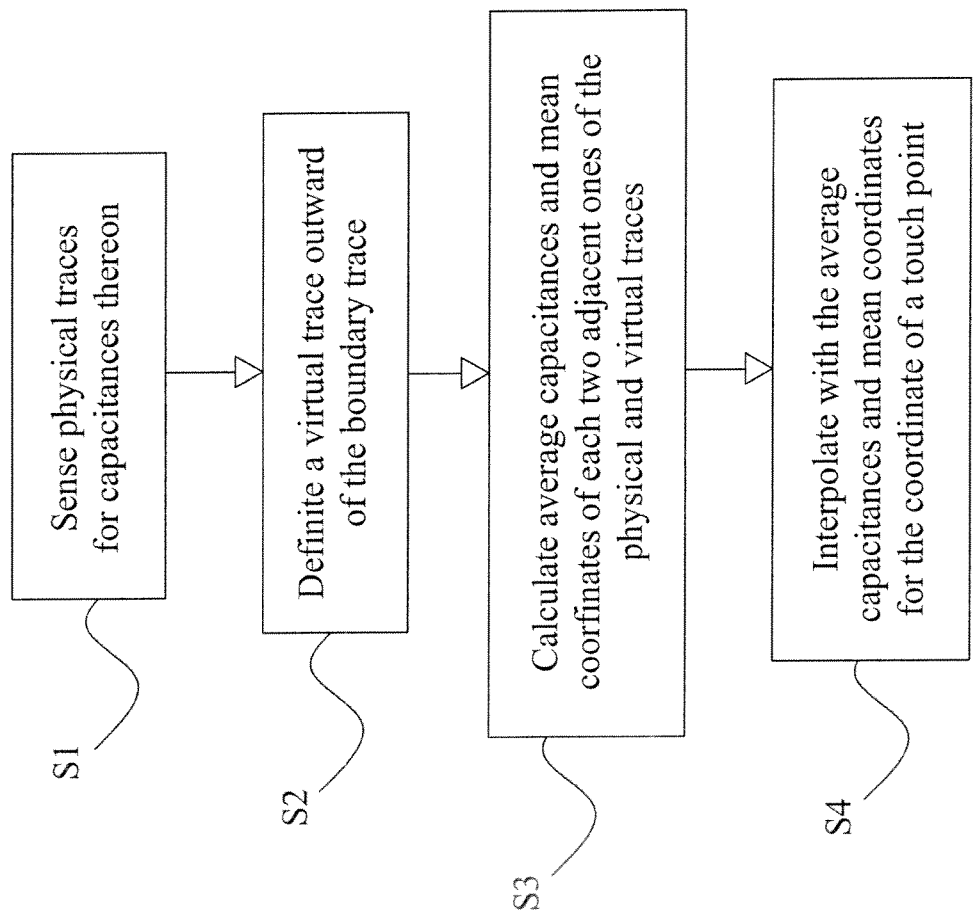
FIG. 3 is a flowchart of a positioning method for a capacitive touch panel.

FIG. 3 is a flowchart of the above positioning method, in which step S1 senses the physical traces 14, 16, 18, 20 and 22 for the capacitances $C_1$, $C_2$, $C_3$, $C_4$ and $C_5$ thereon, step S2 defines the virtual trace 28 outward of the boundary trace 14 and assigns the virtual coordinate $X_0$ and the virtual measured capacitance $C_0'$ thereto, where the virtual measured capacitance can be set zero, non-zero constant, or variable with the measured capacitances $C_1$, $C_2$, $C_3$, $C_4$ and $C_5$, step S3 calculates the average measured capacitances $C_0'$, $C_1'$, $C_2'$, $C_3'$ and $C_4'$ and the mean coordinates $X_0'$, $X_1'$, $X_2'$, $X_3'$ and $X_4'$ from each two adjacent ones of the physical and virtual traces 14, 16, 18, 20, 22 and 28, and step S4 interpolates with the average measured capacitances $C_0'$, $C_1'$, $C_2'$, $C_3'$ and $C_4'$ and the mean coordinates $X_0'$, $X_1'$, $X_2'$, $X_3'$ and $X_4'$ to calculate the X-coordinate of the touch point.

The method according to the present invention can be used in conjunction with any conventional positioning methods in the way that when the measured capacitance of the boundary trace 14 is non zero or is the maximum of the measured capacitances of all the physical traces, the above interpolation algorithm of the present invention is executed to calculate the coordinate of the touch point.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A method for boundary resolution improvement of a capacitive touch panel having a plurality of physical traces in a direction, including a boundary trace, each of said plurality of physical traces being assigned with a respective coordinate in said direction, the method comprising the steps of:

sensing each of said plurality of physical traces for a measured capacitance therefrom;

defining a virtual trace outward of said boundary trace and assigning a virtual coordinate in said direction and a virtual measured capacitance thereto;

calculating a plurality of average measured capacitances by calculating an average value of capacitances from each two adjacent ones of said plurality of physical traces and said virtual trace using said measured capacitances and said virtual measured capacitance; and calculating a plurality of mean coordinates by calculating a mean value of coordinates of each two adjacent ones of said plurality of physical traces and said virtual trace using said respective coordinates and said virtual coordinate; and interpolating with said plurality of average measured capacitances and said plurality of mean coordinates to calculate a coordinate in said direction for a touch point.

2. The method of claim 1, wherein said virtual measured capacitance is zero.

3. The method of claim 1, wherein said virtual measured capacitance is a non-zero constant.

4. The method of claim 1, wherein said virtual measured capacitance is a variable related to said measured capacitances of said plurality of physical traces.

* * * * *